Nov. 28, 1933.    M. PARIDON    1,937,161
MATCH FEEDING MECHANISM
Filed Aug. 31, 1932    3 Sheets-Sheet 1
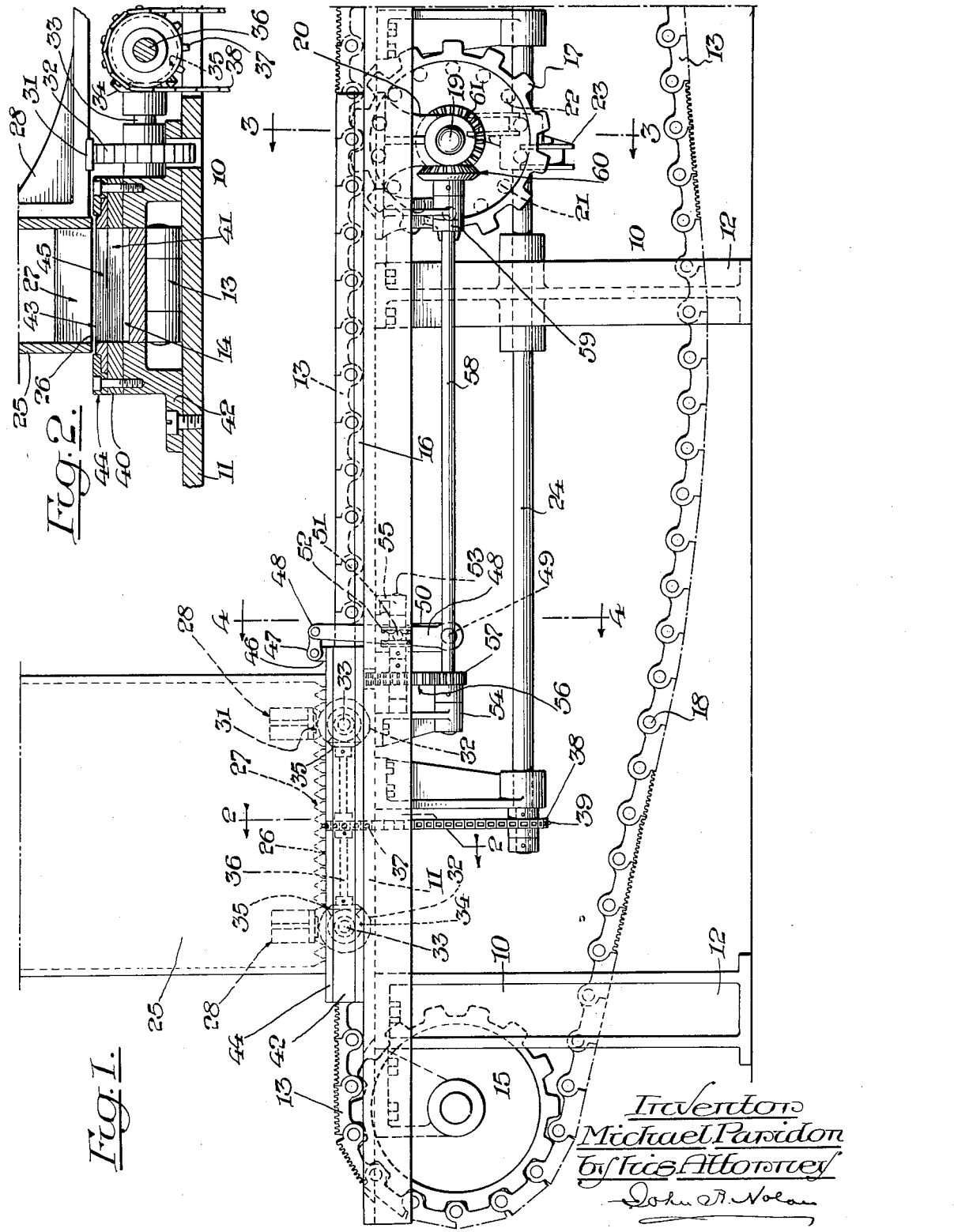

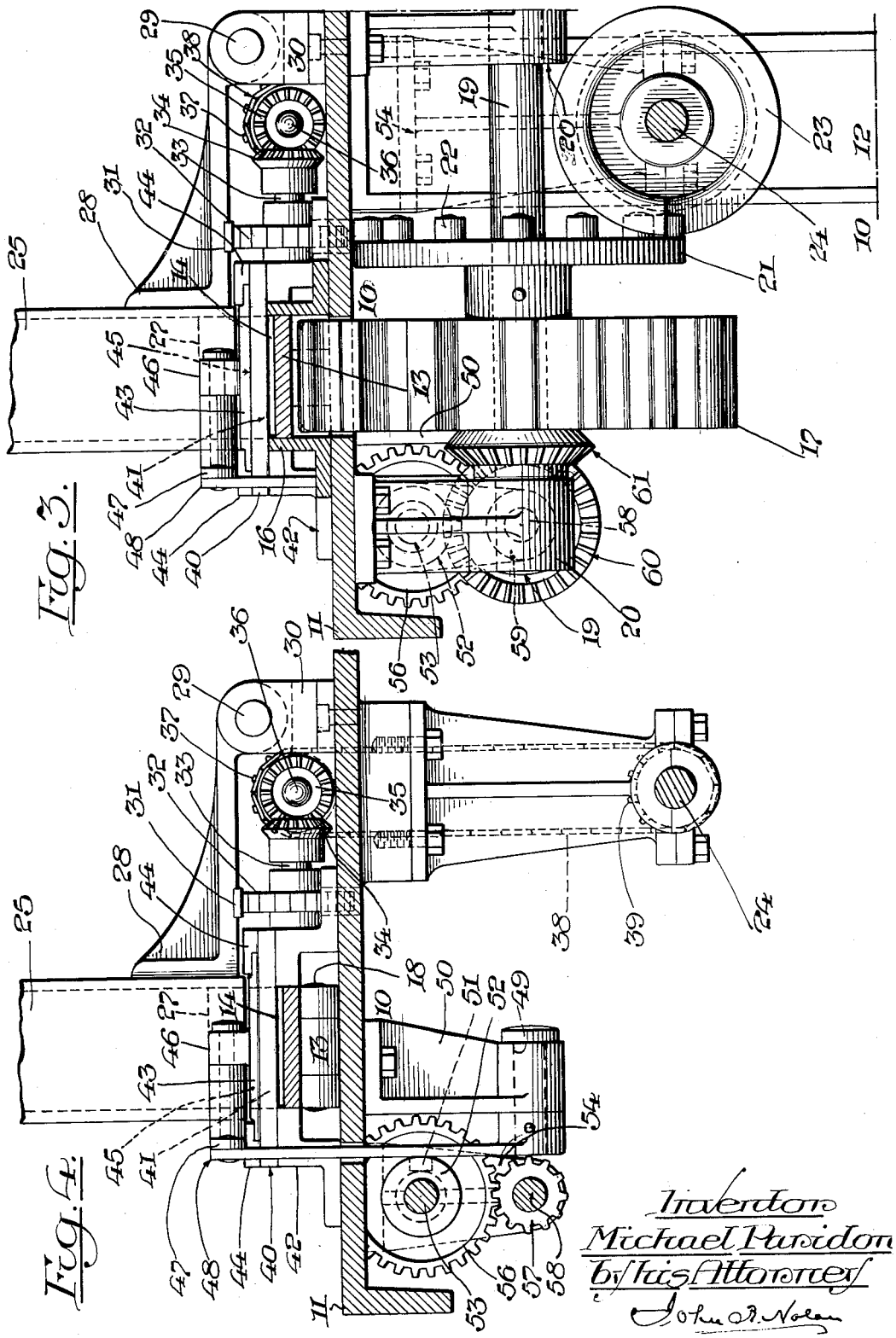

Nov. 28, 1933.  M. PARIDON  1,937,161
MATCH FEEDING MECHANISM
Filed Aug. 31, 1932
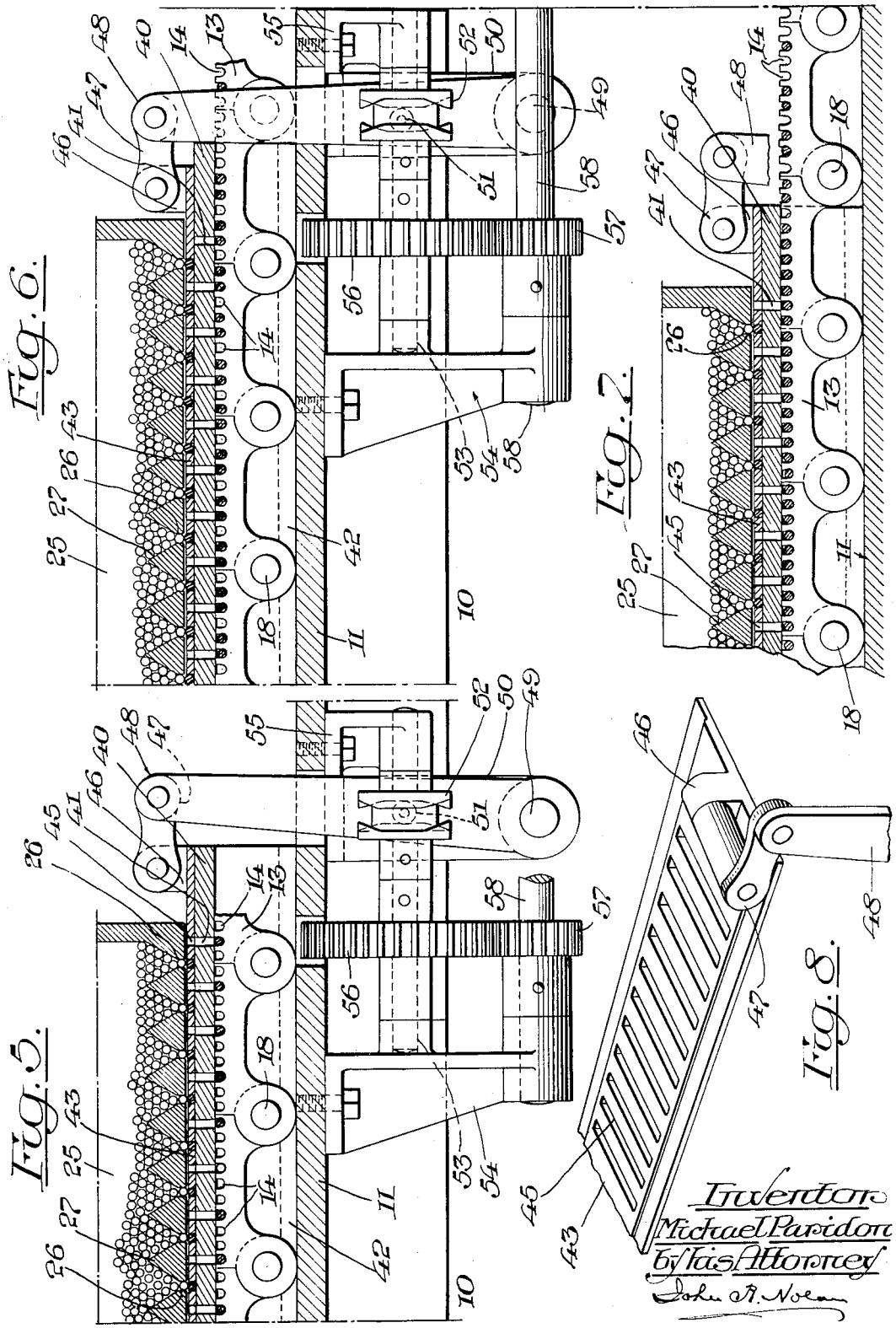

Patented Nov. 28, 1933

1,937,161

UNITED STATES PATENT OFFICE 1,937,161

MATCH FEEDING MECHANISM

Michael Paridon, Barberton, Ohio, assignor to The Diamond Match Company, Baltimore, Md., a corporation of Maryland Application August 31, 1932. Serial No. 631,119

6 Claims. (Cl. 198—20)

This invention relates to mechanism for feeding matches in an orderly manner to a match conveyer, such, for example, as is employed in a match packeting machine.

The principal object of the invention is to provide simple and efficient means whereby rows of single matches, in spaced parallel relation, are successively discharged from a hopper and accurately seated in an intermittently movable match conveyer directly underlying the hopper in such manner as to ensure a uniform and uninterrupted supply of matches to the conveyer.

With this and other objects in view the invention comprises novel features of construction and combinations of parts which, in a preferred form, will be hereinafter described; the scope of the invention then being expressed in the appended claims.

In the drawings—

Figure 1 is a front elevation of a portion of a match packeting machine equipped with match feeding mechanism embodying my invention.

Fig. 2 is a transverse vertical section in a plane through the match supply hopper, as on the line 2—2 of Fig. 1.

Fig. 3 is a similar section in a plane adjacent the conveyer actuating mechanism, as on the line 3—3 of Fig. 1.

Fig. 4 is a similar section adjacent the hopper as on the line 4—4 of Fig. 1.

Fig. 5 is a longitudinal vertical section in a plane through a portion of the hopper, showing the reciprocating match transfer plate as positioned to deposit a row of spaced parallel matches in match receiving grooves in the underlying conveyer.

Fig. 6 is a similar section, showing the transfer plate as positioned to receive a succeeding row of spaced matches from the hopper preparatory to their delivery to the grooves of the underlying conveyer.

Fig. 7 is a partial longitudinal section of the hopper and adjuncts, showing a section of the conveyer as fully supplied with matches when such section passes from beneath the hopper.

Fig. 8 is a perspective view of a portion of the transfer plate.

Referring to the drawings, 10 designates a suitable supporting frame comprising a table 11 and standards 12.

13 designates a portion of an intermittently movable match conveyer comprising, in the present instance, an endless chain of links, each having in its upper surface a series of, say, ten, transversely-extending uniformly-spaced parallel grooves 14 for the reception of a row of single matches extending transversely of the conveyer. The chain is supported and guided at the respective ends of the table by suitably-disposed sprocket wheels, one of which is shown at 15 (Fig. 1), the upper horizontal run of the conveyer being arranged to travel in a longitudinal guideway 16 on the table and being intermittently impelled.

In the present instance a suitably-disposed sprocket wheel 17, which extends through an opening in the table, engages the pivotal lug connections 18 of the adjacent links of the conveyer, the wheel being fast on a transverse shaft 19 which has its bearings in hangers 20 beneath the bed. Fast on the shaft 19 is a pin wheel 21 with the pins 22 of which engages a worm cam 23 on the drive shaft 24 of the machine, the contour of the cam and the relative positions of the pins being such that the wheel 21 is intermittently rotated with uniform steps of sufficient amplitude to effect through the described sprocket gearing successive movements of the conveyer each equal to the length of a link.

25 designates a hopper which overhangs the path of the conveyer adjacent one end of the table, and which hopper is constructed to contain a mass of matches in substantial parallelism, lying transversely of the conveyer and having their heads pointing in the same direction. The bottom of the hopper is provided with uniformly spaced slots 26 extending transversely thereof, the dimensions of each slot being such as to permit a single match lying longitudinally of and over the slot to pass freely therethrough. The bottom of the hopper is beveled, as at 27, between adjacent slots 26 to provide flared or V-shaped entrances to the respective slots, thus facilitating the passage of the matches to the slots. In the present instance the distance between the centers of two adjacent slots is equal to that occupied by four successive grooves in the match conveyer, for a purpose hereinafter described.

The hopper is preferably supported by a pair of spaced rearwardly extending arms 28 which are pivoted at their outer ends, as at 29, on brackets 30 on the table, and which arms are provided on their under surfaces with inserts 31 which rest on a pair of peripherally serrated or notched wheels 32 fast on suitably-disposed shafts 33 underlying the respective arms. Fast on the rearward ends of the shafts 33 are bevel gears 34 in mesh with similar gears 35 on the respective ends of a longitudinally extending shaft 36 which has secured thereto a sprocket wheel 37 that is connected by means of a chain 38 with a similar wheel 39 fast on the main shaft 24. During the operation of the main shaft the motion is transmitted therefrom to the shaft 36, thence to the shaft 33 and the wheels 32 thereon, which wheels impart short rapid vertical vibrations to the arms 28 and the hopper 25 in a manner to agitate and settle the matches within the latter.

Supported immediately above the path of the upper run of the conveyer beneath the hopper is a stationary horizontal bed comprising a plate 40 provided with uniformly spaced slots 41 which extend transversely of the plate in alternation with the bottom slots 26 of the hopper and in vertical alignment with correspondingly spaced grooves 14 of the conveyer during each dwell of the latter. The dimensions of each slot 41 of the bed plate are such as to permit a single match when it is properly presented thereto to pass freely through the slot into the underlying groove of the conveyer. In the present instance the bed plate is supported at its longitudinal edges by a pair of spaced angle members 42 fastened to the top of the table. These members also serve as a guide for the conveyer at the hopper.

Interposed between the bed plate 40 and the slotted bottom of the hopper is a horizontal longitudinally-reciprocative match transfer element comprising a plate 43 which is slidably mounted in suitable guideways provided by gibs 44 at the respective longitudinal edges of the plate 40. The transfer plate 43 has transversely-extending slots 45 which correspond in size and form with the bottom and bed slots and are arranged in such spaced relation that the slots 45 are in alternate registry with the bottom and bed slots at each limit of motion of the transfer plate, and hence the registering relation of the slots 45 to the bottom and bed slots is interchanged during each stroke of the transfer plate, as seen in Figs. 5 and 6.

The transfer plate 43 is reciprocated longitudinally of the intermittently moving conveyer in such timed relation thereto that during each step of the conveyer the alternate slots of the transfer plate are moved first into registry with the respective bottom slots 26 of the hopper to receive a supply of single matches from the latter and permit them to rest on the surface of the bed plate (as seen in Fig. 5), and then into registry with the respective slots 41 of the bed plate 40 to advance the segregated row of matches on the bed plate and position them over the slots 41, at which time the conveyer is at rest with the grooves of the conveyer also in registry with the slots 41, thus the matches drop singly and in parallelism through the bed slots 41 into the respective underlying grooves of the conveyer, as seen in Figs. 5 and 6.

As the upper run of the conveyer is intermittently impelled in its path beneath the hopper the filled transverse grooves in the upper surface of the conveyer progress below and beyond the successive slots 41 of the bed plate 40, and the empty grooves of the conveyer are presented at regular intervals to the slots 41 and thereby supplied with matches,—one match in each groove—, the relation of the grooves and slots being such that after a series, say three of the conveyer links have passed beyond the hopper each succeeding link carries in its grooves (as seen in Fig. 7) a complete charge of matches in proper position for further operations, as for example, packeting.

In the present instance one end of the transfer plate 43 is provided with an upstanding lug 46 which is pivotally connected by means of a link 47 with an upstanding lever 48 fulcrumed, as at 49, on a suitably-disposed hanger 50 beneath the table. The lever has thereon a laterally projecting pin or roll 51 which is operatively fitted in the circumferential race of a cam 52 fast on a short horizontal shaft 53 having its bearings in spaced brackets 54 and 55 beneath the table. This shaft has fast thereon a gear 56 in mesh with a gear 57 on a lower parallel shaft 58 having its bearings in the bracket 54 and in a bracket 59 adjacent the pin-wheel shaft 19. The latter shaft has fast thereon a bevel gear 60 in mesh with a similar gear 61 on the adjacent end of the shaft 19. By this arrangement of gearing motion is transmitted from the shaft 19 to the shaft 53 in a manner to rotate the cam 52 and thereby effect the oscillation of the lever 48 and the horizontal reciprocation of the transfer plate 43; the ratio of the gearing and the contour of the cam race being such that the transfer plate is reciprocated in timed relation to the intermittent travel of the conveyer, as hereinbefore described.

It is to be understood that my invention is not limited to the particular construction herein disclosed as the mechanisms may be variously modified within the principle of the invention and the scope of the appended claims.

I claim—

1. In combination with an intermittently movable conveyer having a succession of spaced parallel supporting portions for single matches extending transversely of the conveyer, a match supporting bed overlying the conveyer and having transverse openings for the passage and guidance of succeeding groups of single matches in parallelism with the adjacent match supporting portions of the conveyer, the space between adjacent openings spanning a series of the supporting portions of the conveyer, means for delivering succeeding groups of single matches in spaced parallel relation above the bed, an element for positioning each of said groups in the respective spaces between and in parallelism with the openings of the bed, and means for effecting relative longitudinal movement between said element and bed to present the single matches of each succeeding group parallelly to the respective openings of the bed in timed relation to the travel of the conveyer.

2. In combination with an intermittently movable conveyer having a succession of spaced parallel supporting portions for single matches extending transversely of the conveyer, a match supporting bed overlying the conveyer and having transverse openings for the passage and guidance of succeeding groups of single matches in parallelism with the adjacent match supporting portions of the conveyer, the space between adjacent openings spanning a series of the supporting portions of the conveyer, a hopper having parallel bottom slots therein for delivering succeeding groups of single matches in spaced parallel relation above the bed, an element for positioning each of said groups in the respective spaces between and in parallelism with the openings of the bed, and means for effecting relative longitudinal movement between said element and bed to present the single matches of each succeeding group parallelly to the respective openings of the bed in timed relation to the travel of the conveyer.

3. In combination with an intermittently movable conveyer having a succession of spaced parallel supporting portions for single matches extending transversely of the conveyer, a match supporting bed overlying the conveyer and having transverse openings for the passage and guidance of succeeding groups of single matches in parallelism with the adjacent match supporting portions of the conveyer, the space between adjacent openings spanning a series of the supporting portions of the conveyer, a hopper having parallel bottom slots in staggered relation with the openings in the bed for delivering succeeding groups of single matches in spaced parallel relation above the bed, an element for positioning each of said groups in the respective spaces between and in parallelism with the openings of the bed, and means for effecting relative longitudinal movement between said element and bed to present the single matches of each succeeding group parallely to the respective openings of the bed in timed relation to the travel of the conveyer.

4. In combination with an intermittently movable conveyer having a succession of parallel grooves for single matches extending transversely of the conveyer, a bed overlying the conveyer and having a series of slots in parallelism with the said grooves, the space between adjacent slots spanning a series of the grooves, means for delivering succeeding groups of single matches in spaced parallel relation above the bed, an element overlying said bed and reciprocative longitudinally of the conveyer, said element constructed to receive succeeding rows of individual matches and position the matches of each row on the bed in parallelism and in alternation with the slots of the bed and then to shift the supported matches to the mouths of the adjacent slots of the bed, and means for operating said element in timed relation to the conveyer whereby in each succeeding dwell of the conveyer a series of single matches are delivered through the slots of the bed to the grooves of the conveyer in registry with said slots.

5. In combination with an intermittently movable conveyer having a succession of parallel grooves for single matches extending transversely of the conveyer, a bed overlying the conveyer and having a series of slots in parallelism with the said grooves, the space between adjacent grooves spanning a series of the grooves, a hopper for delivering succeeding groups of single matches in spaced parallel relation above the bed, an element overlying said bed and reciprocative longitudinally of the conveyer, said element having spaced parallel slots therein for receiving the matches delivered by the hopper and positioning them on the bed in alternation with the slots of the latter and then shifting the supported matches to the mouths of the adjacent slots of the bed, and means for operating said element in timed relation to the conveyer whereby in each succeeding dwell of the conveyer a series of single matches are delivered through the slots of the bed to the grooves of the conveyer in registry with the slots of the bed.

6. In combination with an intermittently movable conveyer having a succession of closely spaced parallel portions for the support of single matches extending transversely of the conveyer, a match supply hopper overhanging said conveyer and including a bottom with a series of relatively widely spaced slots in parallelism with the said match supporting portions, each slot of a size and form for the free passage and guidance therethrough of a single match, a bed overlying the conveyer beneath the hopper and having a series of parallel slots corresponding in number with the said bottom slots and alternating therewith, a reciprocative transfer member interposed between the hopper and bed, said member having a succession of parallel slots which are in alternate registry with the bottom and bed slots at the limit of each stroke of said member, and means for reciprocating said member longitudinally of and in timed relation to the conveyer, whereby in each succeeding dwell of the conveyer a series of single matches are delivered through the slots of the bed to the match supporting portions of the conveyer in registry with the slots of the bed.

MICHAEL PARIDON.